July 25, 1939.  M. PIER ET AL  2,167,004
PRODUCTION OF HYDROCARBONS
Filed Dec. 16, 1936
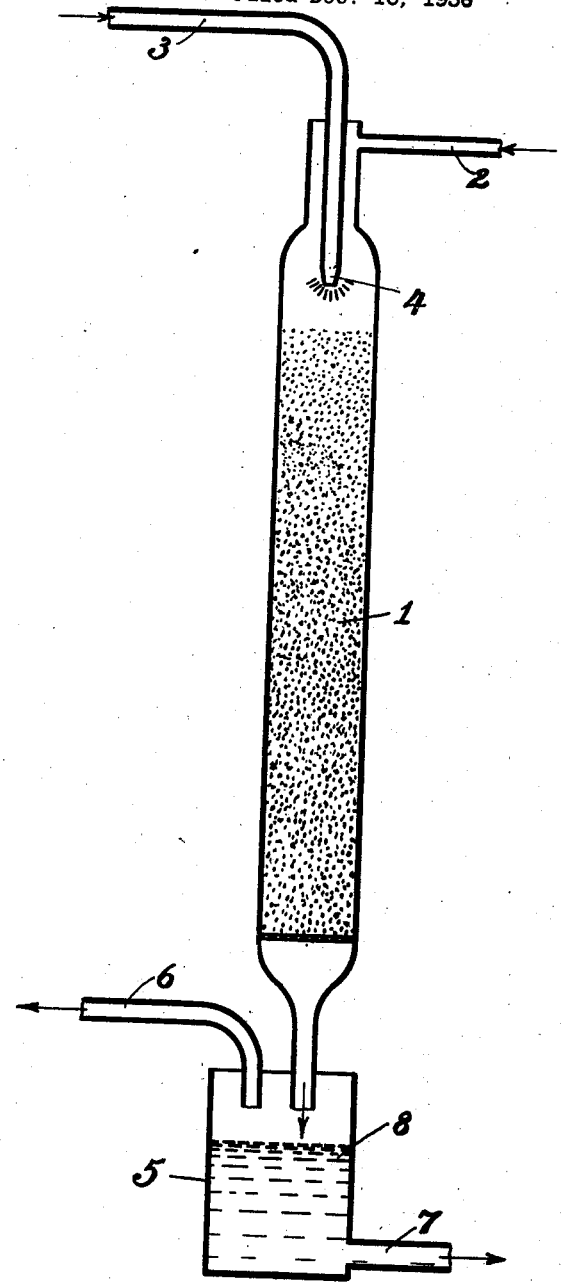
Mathias Pier
Wilhelm Michael
Wolfgang Jaeckh
INVENTORS
BY Hutz and Joslin
THEIR ATTORNEYS Patented July 25, 1939

2,167,004

UNITED STATES PATENT OFFICE 2,167,004

PRODUCTION OF HYDROCARBONS

Mathias Pier, Heidelberg, Wilhelm Michael, Ludwigshafen - on - the - Rhine, and Wolfgang Jaeckh, Heidelberg, Germany, assignors to I. G. Farbenindustrie Aktiengesellschaft, Frankfort-on-the-Main, Germany Application December 16, 1936, Serial No. 116,124
In Germany December 20, 1935

4 Claims. (Cl. 260—449)

This invention relates to the production of hydrocarbons, in particular those containing at least two carbon atoms in the molecule, by the interaction of carbon monoxide with hydrogen.

In the conversion of carbon monoxide by means of hydrogen into liquid, solid and/or gaseous hydrocarbons it may happen that products of high molecular weight, in particular paraffin waxes, formed during the reaction settle on the catalyst and impair its activity. The strong evolution of heat occurring in this reaction readily leads to thermal congestion in the catalysts, whereby it is difficult or quite impossible without the use of special measures to maintain the desired reaction temperature, such as a great subdivision of the reaction chamber in order to lead away the heat.

We have now found that the said conversion of carbon monoxide and hydrogen into hydrocarbons, in particular those containing at least two carbon atoms in the molecule, which is very sensitive as regards the temperature to be maintained, can be carried out very smoothly without great trouble or difficulties as regards apparatus by continuously or periodically trickling the rigidly arranged catalyst with a liquid during the conversion whereby the catalyst is maintained at a desired temperature. When working in this manner the activity of the catalyst does not subside during the reaction. Since the reaction is to be carried out in the gas phase the formation of a liquid level in the reaction chamber should be avoided. By the said trickling the settling of products of high molecular weight on the catalyst is prevented because any products of high molecular weight deposited on the catalyst may be dissolved off again and furthermore a cooling of the catalyst takes place so that it is possible to arrange the catalyst in tubes of any width. Since the liquid medium trickles down at the surface of the catalyst and cover the latter only in a thin layer, the gases to be brought into reaction can readily contact with the catalyst because the distance which the gases have to travel through the liquid is only very small. This is of considerable advantage as compared with working while wholly or partly filling the reaction chamber with liquid in which case the gases cannot contact so readily with the catalyst.

As catalysts suitable for the said conversion may be mentioned any substances catalytically promoting this conversion which are rigidly arranged either in the form of pieces or precipitated on carriers, advantageously metallic carriers. For example pieces, rings, balls or nets of catalytic substances, such as for example those containing metals of the iron group, such as iron or nickel, may be employed. Precipitates of catalytic substances on pumice stone or pieces, nets or balls of metal, clay, procelain or glass may also be used.

The liquid medium used according to this invention may be passed in the same direction as the gases or in counter-current thereto. Suitable liquids are alcohols, hydrocarbons and other liquids which do not injure the catalysts and which remain liquid under the working conditions or are only partly vaporized during the cooling process. As liquids suitable for the reduction of carbon monoxide are especially those in which the products of high molecular weight formed during the reaction are readily dissolved or suspended, in particular organic solvents, such as middle oils, heavy oils, paraffin oils and anthracene oils, and in particular liquid substances formed during the reaction itself, i. e. the characteristic oil. Of this characteristic oil, it is preferable to use fractions of which at least a considerable portion remains liquid under the reaction conditions. Similarly when using foreign liquids, at least a part of the same should remain liquid under the reaction conditions. The amount of liquid medium is preferably selected so that there is always a thin layer of liquid present on the surface of the catalyst. In some cases it may be advantageous temporarily to interrupt the trickling, especially when a temporary increase in temperature at the catalyst is desired. The liquid is advantageously pumped in circulation, if desired while interposing heat-exchangers. The operation according to the present invention may be effected at any desired pressures. For example a slight excess pressure, such as 2, 3, 5 or 10 atmospheres, or higher pressures, such as 50, 100 atmospheres or more, may be used. Atmospheric pressure or reduced pressure may also be employed.

It has also been found to be advantageous to withdraw the liquid medium together with the reaction products from the reaction chamber at the lower end thereof. A separation of the liquid medium from the reaction products may be effected by known methods, as for example by strong cooling, distillation or the use of selective solvents.

When passing the liquid medium in a cycle over the catalyst the liquid and high molecular reaction products absorbed by the liquid medium may be removed therefrom continuously or at certain intervals of time.

The conversion is carried out at the usual temperatures, preferably above 150° C. and advantageously between 200° and 450° C.

The composition of the initial gases may be as usual.

The following example is given with respect to the accompanying drawing which illustrates in a diagrammatic manner an elevation in section of an example of apparatus suitable according to this invention, and will further illustrate how this invention may be carried out in practice but the invention is not restricted to this example or to the particular example of apparatus shown.

*Example*

A mixture of carbon monoxide and hydrogen is led through a pipe 2 into the upper part of a reaction chamber 1 charged with a rigidly arranged catalyst consisting for example of iron with 5 per cent of aluminium oxide. Paraffin oil is introduced through the pipe 3, the liquid being distributed uniformly over the cross-section of the catalyst space by the nozzle 4. The catalyst, which is arranged in the reaction chamber in the form of pieces, is thus uniformly trickled by the paraffin oil. No liquid level is maintained in the catalyst chamber so that the spaces between the pieces of catalyst are almost entirely filled by the reaction gases. The mixture of paraffin oil and liquid and gaseous reaction products flows downwards into a cooled separating vessel 5 in which the separation of the liquid from gases takes place and in which a liquid level 8 is maintained. The gaseous portion, consisting mainly of unconverted initial gas, is withdrawn through the pipe 6 and may be further reacted in a second reaction chamber or returned to the same reaction chamber for further reaction. The liquid portion is removed through the pipe 7.

What we claim is:

1. A process for carrying out the conversion of carbon monoxide with hydrogen for the production of hydrocarbons in the presence of a rigidly arranged catalyst which comprises passing the said carbon monoxide and hydrogen at a reacting temperature over such catalyst and simultaneously trickling over the catalyst a medium which is at least partly liquid under the conditions employed, while avoiding the formation of a liquid level in the catalyst space.

2. In the process as claimed in claim 1 trickling over the catalyst a liquid medium in which the hydrocarbons formed by the conversion are readily dissolved.

3. In the process as claimed in claim 1 collecting such liquid hydrocarbons formed by the conversion as remain at least in part liquid under the operation condition and trickling them as liquid medium over the catalyst.

4. A process for carrying out the conversion of carbon monoxide with hydrogen for the production of hydrocarbons in the presence of a rigidly arranged catalyst which comprises passing the said carbon monoxide and hydrogen at a reacting temperature over such catalyst and simultaneously trickling over the catalyst a petroleum oil which is at least partly liquid under the conditions employed, while avoiding the formation of a liquid level in the catalyst space.

MATHIAS PIER.
WILHELM MICHAEL.
WOLFGANG JAECKH.